(12) United States Patent
Gan et al.

(10) Patent No.: US 8,982,892 B2
(45) Date of Patent: Mar. 17, 2015

(54) AUTOMATIC GUARD PERIOD ADJUSTMENT IN A BASE STATION FOR TIME DIVISION DUPLEXED WIRELESS COMMUNICATIONS

(75) Inventors: Jiansong Gan, Beijing (CN); Christian Hoymann, Aachen (DE); Yin Liu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 124 days.

(21) Appl. No.: 13/816,378

(22) PCT Filed: Sep. 16, 2010

(86) PCT No.: PCT/CN2010/001416
§ 371 (c)(1),
(2), (4) Date: Feb. 11, 2013

(87) PCT Pub. No.: WO2012/019327
PCT Pub. Date: Feb. 16, 2012

(65) Prior Publication Data
US 2013/0136028 A1  May 30, 2013

(30) Foreign Application Priority Data
Aug. 13, 2010 (WO) ............... PCT/CN2010/001226

(51) Int. Cl.
*H04L 12/28* (2006.01)
*H04L 12/56* (2006.01)
(Continued)

(52) U.S. Cl.
CPC . *H04W 24/02* (2013.01); *H04J 3/16* (2013.01)
USPC .................... 370/395.4; 370/345; 370/280

(58) Field of Classification Search
CPC .................. H04J 3/16; H04W 24/02
USPC ............. 370/276, 345, 395.4, 503, 241, 328, 370/465, 280
See application file for complete search history.

(56) References Cited

U.S. PATENT DOCUMENTS 5,689,502 A    11/1997  Scott
6,347,113 B1   2/2002  Hatch
(Continued)

FOREIGN PATENT DOCUMENTS

CN    1358039 A    7/2002
CN    1592147 A    3/2005
(Continued)

OTHER PUBLICATIONS

WO2008/088255.*
(Continued)

*Primary Examiner* — Chuong T Ho
(74) *Attorney, Agent, or Firm* — Coats & Bennett, PLLC

(57) ABSTRACT

The present invention is directed to a method for adjusting a guard period in a base station for a cellular wireless communication system. The base station is adapted to communicate in a frame structure comprising a downlink frame followed by the guard period followed by an uplink frame. The method comprises the following steps: measuring interference in dependence on time from at least one interfering base station; and adjusting an uplink frame start time within the frame structure in dependence on the measured interference. The invention also relates to a base station, a network management entity, a computer program product and a method for operating the network entity.

21 Claims, 6 Drawing Sheets

(51) Int. Cl.
*H04W 24/02* (2009.01)
*H04J 3/16* (2006.01)

(56) References Cited

U.S. PATENT DOCUMENTS

| | | | |
|---|---|---|---|
| 8,509,122 B2 * | 8/2013 | Astely et al. | 370/276 |
| 8,537,688 B2 * | 9/2013 | Astely et al. | 370/241 |
| 2002/0071415 A1 | 6/2002 | Soulabail et al. | |
| 2003/0026215 A1 | 2/2003 | Schafer | |
| 2003/0156594 A1 | 8/2003 | Trott et al. | |
| 2005/0074067 A1 | 4/2005 | Nieto et al. | |
| 2006/0068715 A1 | 3/2006 | Hundal et al. | |
| 2008/0080448 A1 | 4/2008 | Rottinghaus | |
| 2008/0248796 A1 | 10/2008 | Oh et al. | |
| 2009/0279457 A1 * | 11/2009 | Lucas et al. | 370/280 |
| 2010/0097964 A1 | 4/2010 | Astely et al. | |
| 2010/0284289 A1 | 11/2010 | Suo et al. | |
| 2010/0311452 A1 | 12/2010 | Li et al. | |
| 2011/0002270 A1 * | 1/2011 | Himayat et al. | 370/328 |
| 2013/0136041 A1 * | 5/2013 | Hoymann et al. | 370/280 |

FOREIGN PATENT DOCUMENTS

| | | |
|---|---|---|
| CN | 101399628 A | 4/2009 |
| CN | 101425839 A | 5/2009 |
| CN | 101631316 A | 1/2010 |
| EP | 1213855 A1 | 6/2002 |
| EP | 1619814 A1 | 1/2005 |
| EP | 1511190 A1 | 3/2005 |
| WO | 9732444 A1 | 9/1997 |
| WO | 0209312 A2 | 1/2002 |
| WO | 03043237 A1 | 5/2003 |
| WO | 2004004140 A2 | 1/2004 |
| WO | 2008088255 A1 | 7/2008 |
| WO | 2008103090 A1 | 8/2008 |
| WO | 2009059555 A1 | 5/2009 |
| WO | 2012019321 A1 | 2/2012 |

OTHER PUBLICATIONS

WO2008/103090.*

International Search Report for PCT/CN2010/001226 mailed May 26, 2011.

Mitsubishi Electric, "Idle Period Shortening for Half Duplex Communications in Large Cells", TSG RAN WG1, Oct. 10, 2005, pp. 1-7, R1-051180, XP003019664, 3GPP, San Diego, California, USA.

International Search Report for PCT/CN2010/001416 mailed May 26, 2011.

* cited by examiner

AUTOMATIC GUARD PERIOD ADJUSTMENT IN A BASE STATION FOR TIME DIVISION DUPLEXED WIRELESS COMMUNICATIONS

TECHNICAL FIELD

The present invention relates to a method for adjusting a guard period in a base station for a cellular wireless communication system. The invention also relates to a method for operating a network management entity, to a base station for a cellular wireless communication system, to a network management entity, and to a computer program product.

BACKGROUND

Time division duplex (TDD) wireless networks, such as Long Term Evolution TDD networks (LTE TDD), use a guard period (GP) between downlink (DL) and uplink (UL) transmission periods. In LTE, transmissions are subdivided into radio frames (10 ms) and subframes (1 ms). In TDD mode, subframes are dedicated to UL transmission, to DL transmission or a subframe is used to transit from DL to UL. In the latter case, the subframe is called special subframe and it starts with a part for downlink transmission, called DwPTS (Downlink Pilot Time Slot). DwPTS is followed by the guard period, which is followed by a part for uplink transmission, called UpPTS (Uplink Pilot Time Slot). In the following, DL transmission periods, i.e., DL subframes and DwPTS, are simply called DL frames and UL transmission periods, i.e., UL subframes and UpPTS, are simply called UL frames. In a cellular system, the downlink refers to a communication from a base station (also referred to as eNB) of a cell to user equipment (UE), e.g. a mobile terminal; whereas the uplink refers to a communication from the user equipment to the base station.

In TDD, a base station of one cell in a cellular wireless communication system potentially interferes with a base station of another cell. For example, the signal transmitted by a base station of one cell during a downlink frame may interfere with a signal received at another base station of a neighboring cell during an uplink frame. This type of interference is also known as inter base station interference (eNB-eNB interference). In order to mitigate inter base station interference TDD networks are usually synchronized, so that DL transmissions and UL transmissions in different cells occur at the same time. However, due to the propagation delay of the transmission from one base station to another inter base station interference may even occur in synchronized networks during the uplink frame following the downlink frame during which the transmission took place.

The guard period between downlink and uplink needs to be large enough to avoid interference of neighboring base stations during the uplink frame. However, the guard period takes away resources for the transmission of payload data, i.e. the time resource. Therefore, a guard period which is as short as possible would improve the efficient usage of the time resource. In general, a minimum length of a guard period would improve performance of the wireless system.

Let us assume that a base station sends data during the entire downlink frame. Then, to be able to receive all data transmitted during the downlink frame, the user equipment served by the base station needs to account for the propagation delay from the base station to the user equipment, i.e. the user equipment needs to stay in receive mode after the end time of the downlink frame has been reached for a further time period covering at least the propagation delay from the base station to the user equipment.

This propagation delay from the base station to the user equipment is denoted by $T_{prop}^{eNB\text{-}UE}$. The user equipment also requires a certain switching time $T_{switch}^{UE}$ to switch from a receive mode to a transmit mode. Assuming that the channel is reciprocal, the propagation delay for transmissions from the user equipment to the base station will also be $T_{prop}^{eNB\text{-}UE}$. To be able to receive by the user equipment all data transmitted in the downlink frame and by taking into account the effect of switching time at the user equipment and the propagation delay of transmissions between the UE and the base station the guard period between downlink and uplink must have the minimum duration of $$GP_{min} = 2 * T_{prop}^{eNB\text{-}UE} + T_{switch}^{UE}. \quad (1)$$

A guard period between downlink frames and uplink frames at a base station which is determined according to equation (1) does not take the effect of interference between neighboring base stations into account. This kind of interference can be severe since the base station transmit power is usually high and base station to base station (eNB-eNB) radio channels might have good propagation conditions due to large antenna gains and possible line-of-sight conditions resulting, for example, from above roof-top deployment of base stations. Thus, the uplink frame may strongly be affected by this kind of interference which may significantly reduce the system's performance.

Besides accounting for the propagation delays and switching times, it would be desirable that the guard periods also helps to avoid occurrence of inter base station interference in the uplink frame at the base station. Direct inter base station interference (eNB-eNB interference) could only be mitigated entirely if the guard period would cover the inter base station signal propagation delay from the most distant base station of the network. Such a large guard period however would degrade the system's performance.

A typical way to determine a guard period between a downlink frame and an uplink frame in a TDD cellular wireless communication system is to rely on experience of system designers. The system designer uses his experience to configure the guard period manually. By manual configuration of the guard period it can not be guaranteed that the selected guard period is optimal. Furthermore, when interference situations and/or cell coverage are changed, a reconfigurations of the guard period may be needed which cost extra effort and time of the system designer.

SUMMARY

Consequently, the invention focuses on the problem of how to obtain an optimal guard period. Advantageously, guard periods are configured in an automatic, self-optimized way, such that the usage of experience and manual configuration by a system designer is not required anymore.

Furthermore, instead of setting a guard period in a similar way in the entire network, the system's performance can, according to the invention, be further improved by adjusting the guard period in an optimal way at each base station separately. I.e. every base station in a network is allowed to configure its own guard period. Such a feature has a particular impact for heterogeneous networks, e.g. networks in which base stations transmit with different transmit powers, serve different cell sizes, and/or show different antenna configurations. Thus the invention further focuses on how an optimal guard period can be obtained individually at each of the base stations of a network.

According to one aspect of the invention a method for adjusting a guard period in a base station for a cellular wireless communication system is provided. The base station is adapted to communicate in a frame structure comprising a downlink frame followed by the guard period followed by an uplink frame. The method comprises the following steps: measuring interference in dependence on time from at least one interfering base station; and adjusting an uplink frame start time within the frame structure in dependence on the measured interference.

The steps of the method for adjusting a guard period in a base station are performed at the base station. The downlink frame and the uplink frame within the frame structure are separated by the guard period. The boundary between the guard period and the uplink frame is defined by the uplink frame start time. By adjusting the uplink frame start time, the guard period is also adjusted.

Preferably, the interference is measured for each interfering base station individually. Once the guard period within the frame structure is adjusted, subsequent communications shall be based on the adjusted frame structure. An adjustment of the guard period/frame structure causes at least one subsequent frame to be transmitted in accordance with the adjusted frame structure.

The boundary between the downlink frame and the guard period may be defined by a downlink frame end time. By adjusting the downlink frame end time and/or the uplink frame start time the guard period within the frame structure can be adjusted. Generally, the position of the guard period within the frame structure and the duration of the guard period can be adjusted by adjusting the end time of the downlink frame and/or the start time of the uplink frame. Generally, each base station in a network can set its guard period differently and individually.

According to one aspect of the invention, a method for operating a network management entity and for adjusting guard periods individually for a number of base stations in a cellular wireless communication system is provided. The method comprises the step: coordinating for the number of base stations the execution of the method for adjusting a guard period in a base station as described above.

According to one aspect of the invention, a base station for a cellular wireless communication system is provided. The base station is adapted to adjust a guard period at the base station and to communicate in a frame structure comprising a downlink frame followed by the guard period followed by an uplink frame. The base station comprises: measuring equipment for measuring interference in dependence on time from at least one interfering base station; and an adjuster for adjusting an uplink frame start time in dependence on the measured interference.

According to one aspect of the invention, a network management entity for a cellular wireless communication system is provided. The network management entity is adapted to manage an individual adjustment of guard periods for a number of base stations in the cellular wireless communication system. The network management entity comprises: a coordinator for coordinating for the number of base stations the execution of the method for adjusting a guard period in a base station for the cellular wireless communication as discussed above.

According to one aspect of the invention, a computer program product comprising software code portions for performing the steps of one of the methods, when the product is run on a processor.

Further embodiments of the invention are further defined in the dependent claims.

DETAILED DESCRIPTION

In the following, preferred embodiments of the invention will be described with reference to the figures. It is noted that the following description contains examples that serve to better understand the claimed concepts, but should not be construed as limiting the claimed invention.

Figure 1:
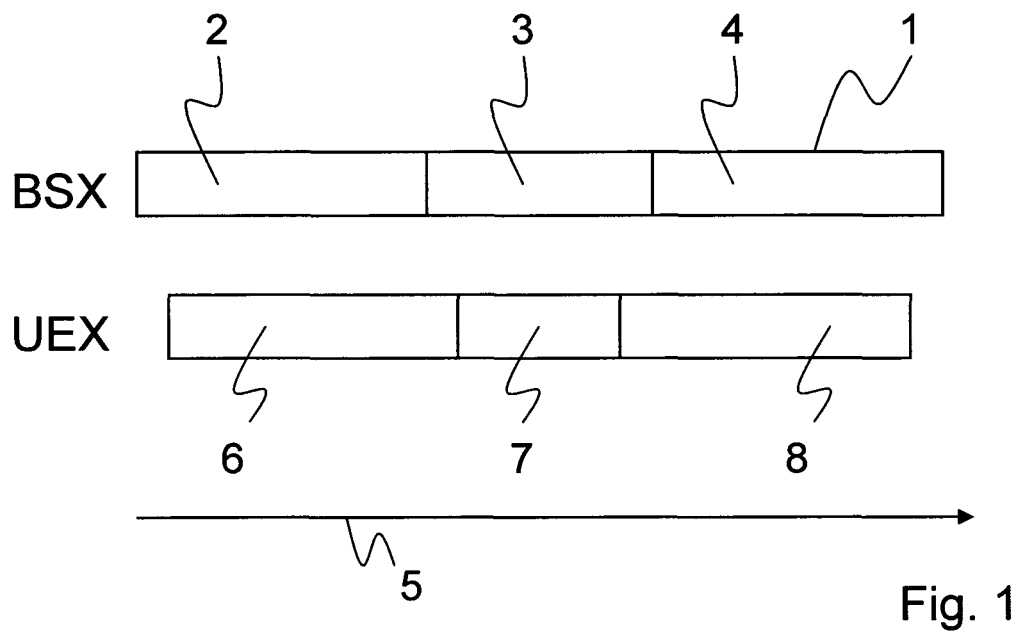
FIG. 1 shows a frame structure at a base station and a user terminal in a TDD wireless communication system with respect to a time line.

FIG. 1 depicts a frame structure for a TDD cellular system from a perspective of a base station BS and also of user equipment UE with respect to a time line 5. The frame structure 1 comprises a downlink frame 2, a guard period 3 and an uplink frame 4, which are separated by boundaries. During the downlink frame 2, the base station BSX transmits data to the user equipment UEX. During the uplink frame 4 the base station BSX receives data from the user equipment UEX. During the guard period 3 the base station BSX does neither transmit data to the user equipment UEX nor receive data from the user equipment UEX.

The user equipment UEX receives the data transmitted in the downlink frame 2 during a received downlink frame 6. Due to a propagation delay caused by the wireless channel between the base station and the user equipment UEX, the received downlink frame 6 shows, with regard to the time line 5, changed boundaries compared to the boundaries of the downlink frame 6. During a switching period 7, the user equipment UEX switches from a receiving mode to a transmitting mode. During a subsequent user equipment uplink frame 8, the user equipment transmits data to the base station.

The data transmitted during the user equipment uplink frame 8 is received at the base station BSX during the uplink frame 4. Due to a propagation delay between the user equipment UEX and the base station BSX, the boundaries of the uplink frame 4 are altered compared to the boundaries of the user equipment uplink frame 8.

To enable that the user equipment UEX receives all the data transmitted from the base station BSX during downlink frame 2 and by taking into account that the user equipment requires switching time to switch from receive to transmit mode and that there is a propagation delay between the base station BSX and the user equipment UEX, the minimum duration of the guard period 3 between the downlink frame 2 and the uplink frame 4 is determined by adding the switching duration, the propagation delay from the base station to the user equipment, and the propagation delay between the user equipment and the base station.

The propagation delay is usually determined on the basis of the maximum cell size supported by a cellular network. A certain margin can be added to the determined guard period to account for special effects such as handover or user equipment being in a handover region of a cell.

Figure 2:
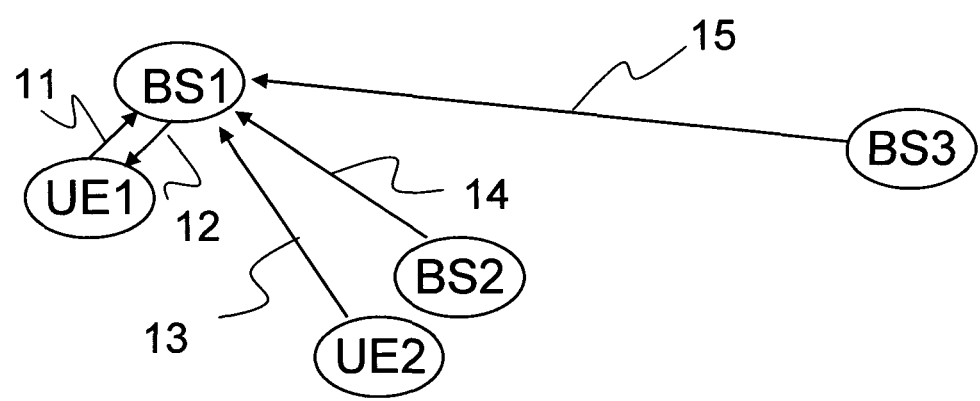
FIG. 2 shows an interference situation in a cellular wireless communication system.

FIG. 2 shows an interference situation in an exemplary cellular wireless communication system having three cells. Each cell is served by one of the base stations BS1, BS2, and BS3. User equipment UE1 is served by base station BS1, and user equipment UE2 is served by base station BS2. All base stations BS1, BS2 and BS3 use the frame structure as discussed above with respect to FIG. 1. The frame structure comprises a downlink frame, a guard period and an uplink frame. The start time of the frame structure is identical for every base station BS1, BS2 and BS3.

During the downlink frame, base station BS1 transmits a signal 12 to user equipment UE1, BS2 transmits a signal 14 to the user equipment UE2 and BS3 transmits a signal 15 to the user equipment in its cell. Signal 14 of base station BS2 and signal 15 of base station BS3 cause also interference at base station BS1. Due to propagation delay, the interference occurs in the guard period and in the uplink frame of base station BS1 following the downlink frame, in which signals 12, 14 and 15 have been transmitted. This kind of interference can be severe since the transmit power of base stations is usually high compared to the transmit power of the user equipment. Furthermore, radio channels between a first and a second base station might have good propagation conditions due to large antenna gains and line-of-sight situations which result from above roof-top deployment. Furthermore, a signal 13, which represents uplink transmissions from user equipment UE2 to base station BS2, can also cause interference at base station BS1.

While the interference during the guard period does not reduce the system performance, the interference in the uplink frame may significantly decrease the quality of the signals received in the uplink frame of the base station. According to the invention, the duration of the guard period between the downlink frame and the uplink frame is set to limit the effect of interference in the uplink frame. The guard period can be changed by changing the boundary between the downlink frame and the guard period and/or by changing the boundary between the guard period and the uplink frame.

An optimal guard period duration depends on the network deployment comprising at least one of a distance between a first and a second base station, site selection, antenna downtilt, transmit power and system load and also on the level of acceptable base station to base station interference. The propagation delay between a first and a second base station is denoted by $T_{prop}^{eNB-eNB*}$; The guard period duration to remove the influence of the interference from the second base station at the first base station is thus $$GP2 = T_{prop}^{eNB-eNB*}. \quad (2)$$

In addition, the user equipment UE2 that belongs to base station BS2 causes interference at the base station BS1. As user equipment UE2 will transmit during its uplink frame it will cause interference at BS1 during the guard period and/or uplink frame of base station BS1.

Figure 3:
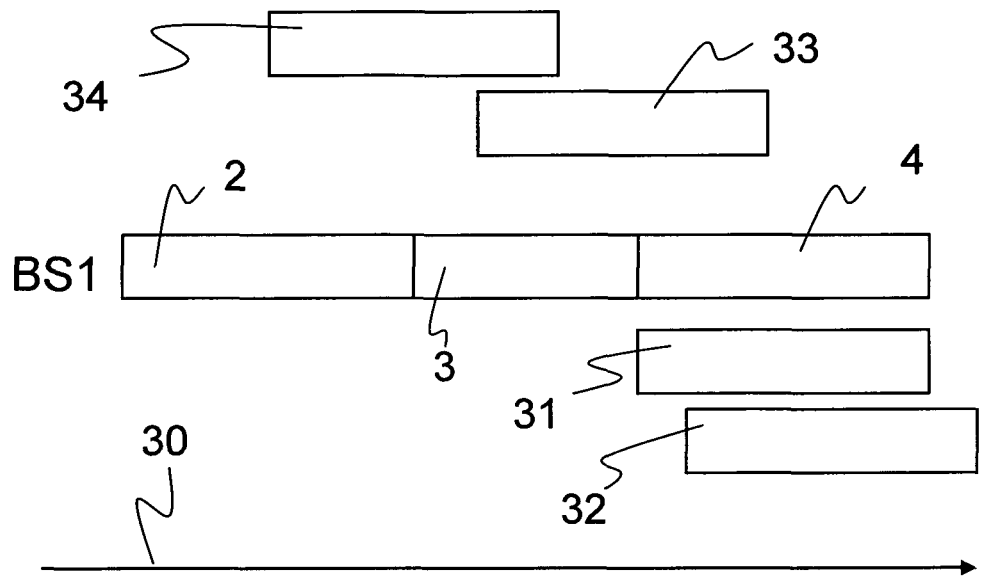
FIG. 3 shows an interference situation with regard to the respective frames at the base station side.

FIG. 3 shows the interference situation depicted in FIG. 2 with respect to certain frames received at the base station BS1. The frame structure at BS1 comprises the downlink frame 2, the guard period 3 and the uplink frame 4, which is depicted with regard to the time line 30. The downlink frames of base stations BS2 and BS3 have the same time alignment as the base station BS1. Due to propagation delay, the interfering downlink frame 34 transmitted by base station BS2 interferes with the frame structure of BS1 as shown. Also the interfering downlink frame 33 of base station BS3 and the interfering uplink frame 32 of user equipment UE2 are depicted. The received uplink frame 31 of UE1 coincides with the uplink frame of BS1.

Figure 4:
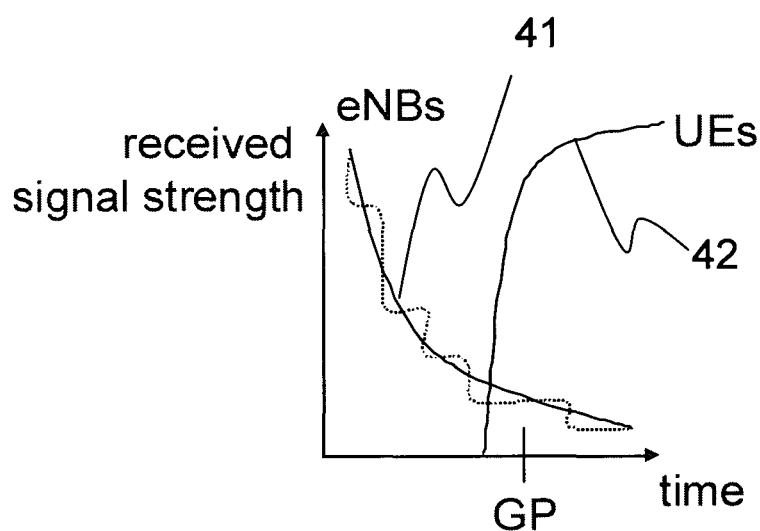
FIG. 4 shows received signal strength as a function of time during a measurement period.

FIG. 4 shows received signal strength as a function of time during a measurement period which covers the guard period and the uplink frame at a base station that suffers from interference. The curve 41 gives a received signal strength resulting from interference from other base stations, e.g. from the frames 33 and 34 in FIG. 3. The curve 42 gives the signal strength of received uplink frames, e.g. frames 31 and 32 in FIG. 3.

The first guard period duration GP1, see equation (1), covering the effects of propagation delay between base station and user equipment and the switching time in the user equipment from receive mode to a transmit mode can be determined from base station (eNB) coordinates or from maximum timing advancement commands, which determine the maximum cell size.

The second guard period duration GP2, see equation (2), shall cover the effect of inter base station interference (eNB-eNB interference) between downlink and uplink frames/subframes. These frames are called DwPTS and UpPTS in LTE. To optimally determine the second guard period, the inter base station interference is measured. For the measurement, it is favorable that a typical operating point (e.g., operating point at a typical network load) is created or actually present in the cellular wireless communication system.

In FIG. 4 two different kinds of signals which are received by a base station (eNB) between downlink and uplink frames are depicted. Curve 41 results from base station (eNB) transmissions during a downlink frame, i.e. the downlink frame preceding the guard period during which the measurement takes place. This curve is degrading either continuously, e.g. when non line of sight (NLOS) situations are dominant or step-wise when strong line of sight components are present. Curve 42 results from signals from user equipment (UEs) scheduled in the uplink subframe following the guard period under consideration. This curve 42 is increasing once the UEs start transmitting.

In order to measure direct inter base station interference (eNB-eNB interference) at a typical operating point a certain network load can be configured. Hence, a network wide coordinated downlink frame with a certain load is configured to create a well defined interference situation in the network. In order to model the worst case scenario, all base station (eNBs) will transmit with full power. In practice, a typical or average load of, for example, around 60% seems to be more reasonable. It might be reasonable to configure such measurements localized in certain regions of the network instead of in the entire network.

User equipment signals potentially disturb the measurements, as can be seen from FIG. 4. This interference can be avoided, when the UEs are muted during the measurement interval. Hence, a network wide coordinated empty uplink frame without any UE traffic can be configured to allow for disturbance-free measurements. UE traffic contains scheduled data, e.g. PUSCH (Physical Uplink Shared Channel), as well as control messages, e.g. PUCCH (Physical Uplink Control channel), RACH (Random Access Channel), SRS (Sounding Reference Signal), etc. In LTE Release 8, the UpPTS contains SRS and RACH only. Furthermore, the empty UL subframe improves the measurement in an extended duration of the measurement interval, which is longer than the actually used guard period.

Measurements usually start at predefined points in time. One choice of such point would be to start eNB (eNodeB) measurements a pre-defined time period after the end time of the downlink subframe. The pre-defined time can be the maximum switching time for base stations (eNBs) from transmit mode to receive mode (Tx-Rx) which is 17 μs in LTE, see 3GPP TS 36.104. The maximum switching time allows Tx-Rx switching at the base station. The timing of the downlink subframe (e.g. DwPTS size), which is known to the system, could be used to combine measurements of different eNBs with potentially different start times. The timing accuracy of synchronized TDD networks could be considered as well.

Figure 5:
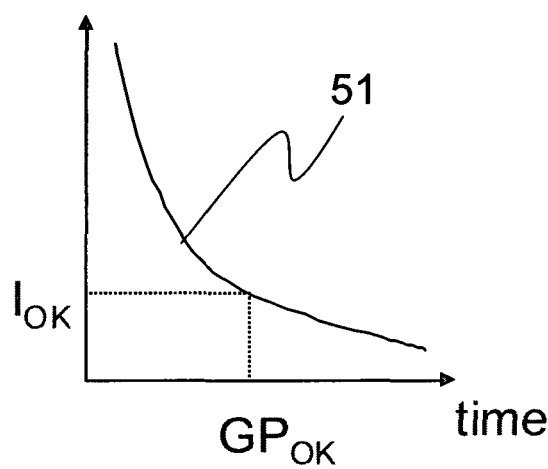
FIG. 5 shows base station (eNB) interference as a function of time.

FIG. 5 shows base station interference (eNB interference) as function of time. After the base stations are configured in the above discussed way, the direct eNB-eNB interference is measured by each eNB. The measurement result is depicted as curve 51 in FIG. 5.

An interference level is acceptable if it is below a certain threshold, which is, for example, set in a way that signal quality degradation due to interference is below a certain level. By using the measurement, i.e. curve 51, from the acceptable interference level $I_{OK}$ the corresponding guard period duration $GP_{OK}$ can be obtained, see FIG. 5. Measurements could be based on total received energy. The measurements can be based on training sequences transmitted by eNBs. Regular training signals (reference signals) can be used as well, which may also identify the transmitting eNB. The interference can also be measured without using artificial interference signals.

If the measurements are performed using artificial interference signals, downlink subframes and uplink subframes may not be usable for payload data transmission which serve user equipments (UEs). To reduce this impact, measurements can be performed during low-load situations in the network, e.g. during the night. Alternatively, the interference signal generated by base stations could be composed of useful signals, such as payload data or control signalling. In that case only one uplink subframe cannot be used. A mixture of useful and artificial interference signals is also possible.

Either the entire measurement (curve 51) or the GP duration $GP_{OK}$ may be sent to a network management entity, for example an Operating Support System (OSS). The management entity then chooses the optimal guard period on the basis of GP1 and $GP_{OK}$, wherein GP1 covers the effects of propagation delay between base stations and user equipment and the switching from receive to transmit mode of the user equipment and $GP_{OK}$ covers the effect of inter base station interference.

The optimal guard period $GP_{opt}$ covering all effects can be determined from the GP1 as well as from the maximum guard period of the multiple guard periods $GP_{OK}$ as reported by multiple eNBs:

$$GP_{opt}=\max\{GP1,\max\{GP_{OK}\}\}. \quad (3)$$

In LTE the duration of the sum of the guard period duration between the downlink frame and the uplink frame and the guard period duration between the uplink frame and the downlink frame shall be an integer multiple of an OFDM symbol duration.

The described method can also be carried out if the measurement results are not collected at a central management entity, such as an Operating Support System, but if they are locally exchanged between base stations in a distributed manner. In this case, the optimal guard period $GP_{opt}$ is calculated by each base station.

The base stations are then (re-)configured with the optimal guard period $GP_{opt}$. The guard period $GP_{opt}$ can be identical in the entire network or can be different from base station to base station or from a subregion of the network to another subregion of the network. A subregion may comprise multiple base stations.

When the duration of the guard period is modified either the duration of the uplink frame or the duration of the downlink frame or both are to be changed. In case of fixed start time and fixed end time of a frame structure comprising downlink frame, guard period and uplink frame, the duration of the downlink frame can be altered by altering the end time of the downlink frame and the uplink frame duration can be altered by changing the start time of the uplink frame.

If the duration of the downlink subframe, e.g. DwPTS, is changed the eNB-eNB interference situation changes and thus new measurements are reasonable. However, ping-pong situations, in which the downlink subframe duration is enlarged due to a first measurement, reduced due to a second measurement, enlarged due to a third measurement and so on are to be avoided. Basically continued increase and decrease of the downlink subframe duration should be avoided, for example by allowing to change the downlink subframe duration during the described kind of re-measurements for a certain number of times, for example only one or two times.

The extra measurement due to alteration of the downlink subframe duration or of the end time of the downlink subframe is not necessary if only the uplink subframe duration or the start time of the uplink subframe is modified.

The described method allows optimally configuring the guard period in TDD networks. The algorithm can be automated leading to self-optimizing TDD networks. With optimized guard period durations, network capacity can be maximized and network disturbance can be minimized.

In a further aspect, it may be allowed to adjust the guard period at each base station individually. This further degree of freedom can be exploited to further improve the efficient usage of network resources.

Figure 6:
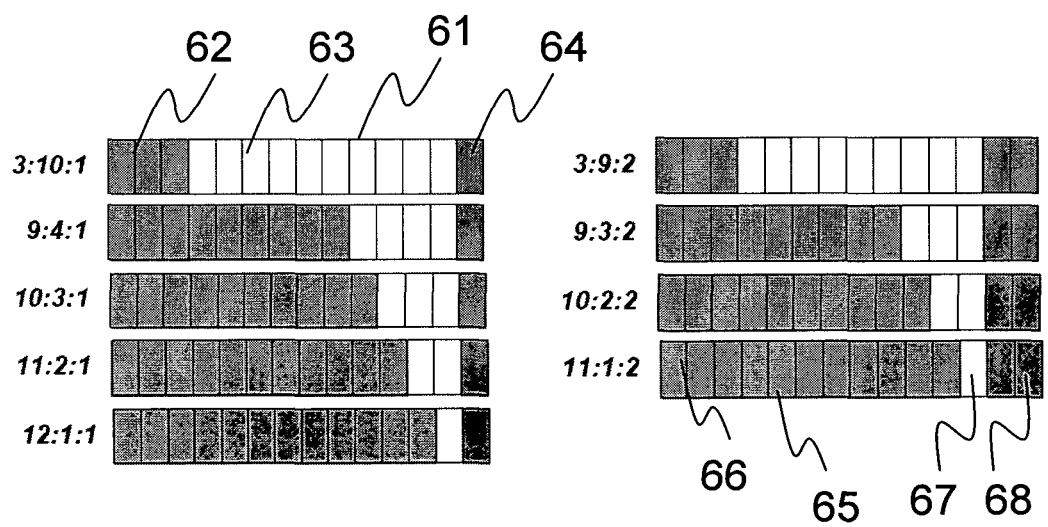
FIG. 6 shows special subframe configurations in LTE TDD.

FIG. 6 shows special subframe configurations in LTE TDD. The special subframe is used to provide a guard period for a switch from a downlink to an uplink. The special subframe comprises three fields, a downlink field (which is called Downlink Pilot Time Slot, DwPTS, in LTE TDD), a guard period, and an uplink frame (which is called Uplink Pilot Time Slot, UpPTS, in LTE TDD). In LTE TDD each special subframe consists of 14 OFDM (Orthogonal Frequency Division Multiplexing) symbols. For example, in FIG. 6, a special subframe 61 comprises a downlink frame 62, a guard period 63, and an uplink frame 64. The downlink frame comprises 3 OFDM symbols, the guard period 63 comprises 10 OFDM symbols and the uplink frame 64 comprises 1 OFDM symbol. A special subframe 65 comprises a downlink frame 66 made of 11 OFDM symbols, a guard period 67 made of 1 OFDM symbol and an uplink frame made of 2 OFDM symbols. Further examples of special subframe configurations are also shown in FIG. 6. Note that in dependence of the selected special subframe both the size of the guard period and its position within the special subframe can be altered, i.e. both the downlink frame end time and the uplink frame start time with respect to the special subframe can be different from one special subframe to another special subframe. In FIG. 6, the time boundaries between the different fields are set with respect to an integer number of OFDM symbols, however time boundaries in a special subframe can generally be set at every time instance. The configurations of special subframes as depicted in FIG. 6 are supported by LTE TDD.

As discussed above, the guard period $GP_{min}$ (see equation 1) can, for example, be determined from base station coordinates or from maximum timing advancement commands, which determines the maximum cell size. With respect to the special subframe structure presented in FIG. 6 a further task is to decide the sizes (or durations) of the guard period, of the downlink frame and of the uplink frame such that inter base station interference is kept below an acceptable level. The configuration of the special subframe can be defined by the number of OFDM symbols assigned to each of the named frames. Generally, there is a frame comprising a downlink frame, a guard period, and an uplink frame. The boundary between the downlink frame and the guard period is defined by the downlink frame end time. This time can be defined with respect to a frame, e.g. the downlink frame end time is the time from the beginning of the frame until the downlink frame (as part of the frame) ends. This time can be identical for several frames. Correspondingly, the boundary between the guard period and the uplink frame is defined as uplink frame start time, which may also be given with respect to the overall frame or special frame. The uplink frame start time and the downlink frame end time can be defined by an integer number of OFDM symbols, respectively.

The downlink frame end time and the uplink frame start time which together define the duration and the position of a guard period can be set or adjusted separately at every base station belonging to a cellular wireless communication system. Alternatively both parameters can be set in an identical way at every base station belonging to the cellular wireless communication network or at least to a region of it. The downlink frame end time and the uplink frame start time shall be set at every base station in a way that the time resource of the network is efficiently used and that inter base station interference is kept below an acceptable level, i.e. the named parameters are to be set in an optimal way. TDD systems are generally designed to be synchronized, i.e. the start time and end time of a frame structure, and also the start and end time of the special subframe are aligned to each other over all base stations belonging to the network. However, different base stations may show different special subframe configuration.

Figure 7:
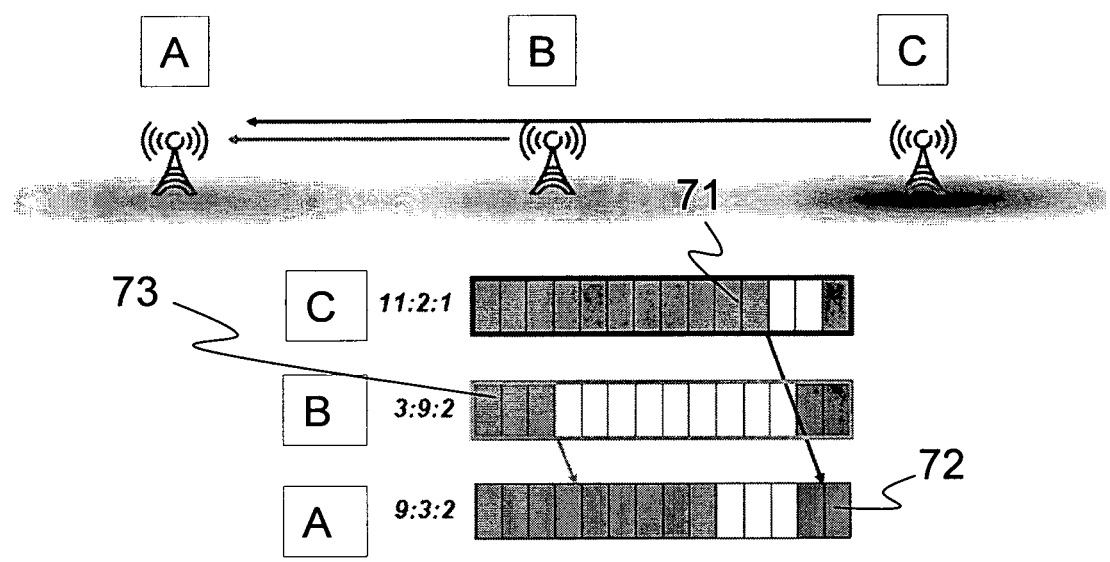
FIG. 7 shows an interference situation with respect to the special subframe.

Inter base station interference is further discussed with respect to FIG. 7. This figure shows an exemplary interference situation with respect to the special subframes of three different base stations A, B, and C.

Inter base station interference occurs when, for example, a downlink transmission 71 of the base station C arrives at the base station A at a time when base station A intends to receive uplink transmissions from user equipment assigned to base station A, i.e. during uplink frame 72.

Whether a potentially interfering base station, e.g. base station C, interferes with a potentially suffering base station, e.g. base station A, depends on the following factors: the size of the downlink frame of the interfering base stations (which can be denoted as an integer number $N_{di}$ of OFDM symbols), the size of the uplink frame of the suffering base station (which can be denoted as an integer number $N_{us}$ of OFDM symbols), and the propagation delay (denoted by $T_p$) between the interfering base station and the suffering base station.

The interference also depends on the synchronisation accuracy of base stations, which is by nature not perfect due to hardware limitations or due to an intentional asynchronous configuration. Possible synchronisation errors or synchronization effects are not explicitly considered by the following equations.

The above discussed inter base station interference occurs, if the propagation delay $$T_p > (N_t - N_{di} - N_{us}) * T_{OFDM} - T_{u2d}, \quad (4)$$

where $N_t$ is the total number of OFDM symbols (which is 14 in LTE TDD in case of normal cyclic prefix) per special subframe, $T_{OFDM}$ denotes the time duration of one OFDM symbol (which is around 71.4 µs in LTE TDD for normal cyclic prefix), and $T_{u2d}$ denotes the switching time at the base station from uplink to downlink (which is, for example, around 20 µs). The value $T_{u2d}$ accounts for a switch from uplink to downlink which may also be performed at the base station.

With respect to the above criterion (inequality 4), in FIG. 7, the base station B does not interfere with base station A, i.e. the downlink transmissions 73 of base station B does not interfere with the uplink transmission frame 72 of base station A; however base station C interferes with base station A. The transmissions from user equipment to base station A, scheduled in the uplink frame 72 may be severely impaired due to the interference of downlink frame 71 of base station C.

In order to reduce risk of having such inter base station interference between two base stations, e.g. base station A and C, the number $N_{us}$ of OFDM symbols in the special subframe at the suffering base station can be reduced and/or the number $N_{di}$ of OFDM symbols in the special subframe of the interfering base station can be reduced. The propagation delay $T_p$ between the two base stations is assumed to be fixed.

Although, in FIG. 7, base station C interferes with base station A, the caused interference level may also be at an acceptable level. For example, when the base station C is very far away from base station A, the interference received at base station A might be below an acceptable interference level.

With respect to LTE TDD, a special subframe of a certain base station, i.e. the DwPTS size $N_d$ and the UpPTS size $N_u$, shall be configured in an optimal way. Subsequently a preferred method for automatic special subframe configuration which is based on measurements of interference of interfering base stations at a specific suffering base station is proposed. The method comprises the following steps.

Step 1: In a first step, a base station i temporarily shuts down its downlink transmissions. The base station i synchronizes its receiver to the downlink signal of an interfering base station j by detecting the synchronisation signals PSS (Primary Synchronization Signal) and SSS (Secondary Synchronization Signal) of the interfering base station j.

If the downlink transmission of base station i is not shut down, detection of the interfering base station's signal may be difficult due to the strong transmission power of the downlink transmission. Shutting down a base station i might be particularly reasonable during night or low load situations. Such a time definition for a shut down is also reasonable in view of energy efficiency.

Step 2: In a second step, timing of an interfering base station j is acquired by tracking its respective PSS and SSS. Additionally, a corresponding cell-identification $ID_j$ of the interfering base station j is acquired. Then a propagation delay $Tp_{ij}$ between the interfering base station j and the (measuring) base station i is obtained.

Step 3: In a third step a power level of a received reference signal (RS) of the interfering base station j is measured and the RS power level is compared with an acceptable interference level I_ok at base station i.

The potential interference level caused by the interfering base station j can be predicted based on the measured RS power level and on a target load level of the network. For example, 70% resource utilisation can be reasonably assumed. Further, a potential RS power boost can be considered. Then, the actual interference caused by payload data symbols will be smaller than the measured power level of reference signals (RSs).

The acceptable interference level I_ok depends also on the total number of potentially interfering base stations. For example, it could be acceptable to have a few strong interfering base stations or alternatively to have many weak interfering base stations.

The measured RS power of the received reference signal transmitted by the interfering base station j may be smaller than I_ok, which means that base station j will not cause serious interference to the measuring base station i. Let $eNB_{ok}$ be the set of such base stations, which do not cause serious interference at base station i.

On the other hand the interfering base station j may cause serious interference to the measuring base station i if the measured interference of base station j is above (or equal to) I_ok, which indicates that the DwPTS transmit signal of the interfering base station j interferes with the UpPTS receive signal of the measuring base station i. Let $eNB_{nok}$ be the set of the base stations, which cause serious interference at base station i.

Step 4: In step 4, the measurement according to step 1 to step 3 are performed for multiple interfering base stations and thus the sets $eNB_{ok}$ and $eNB_{nok}$ are filled.

Step 5: In step 5, the base station i informs the base stations belonging to the set $eNB_{nok}$ about a respective maximum DwPTS size which assures that the transmissions of the respective base stations in the set $eNB_{nok}$ do not interfere with the UpPTS part of the measuring base station i. That is, based on inequality (4), the maximum number $N_{dij\_max}$ of OFDM symbols in the DwPTS frame of the interfering base station j in $eNB_{nok}$ should not exceed $$N_{dij\_max} \leq N_t - N_{ui} - (T_{pij} + T_{u2d})/T_{OFDM}, \quad (5)$$

wherein $T_{pij}$ denotes the propagation delay between the interfering base station j and the measuring base station i and $N_{ui}$ denotes the number of OFDM symbols in the uplink frame UpPST of base station i. The integer number $N_{ui}$ is determined according to step 6.

Step 6: In step 6, base station i select its own UpPTS size $N_{ui}$ based on, for example, a received interference level and/or on whether SRS (Sounding Reference Signal) and/or short PRACH (Physical Random Access Channel) is needed. Once the parameter $N_{ui}$ is determined, the number $N_{dij\_max}$ can be calculated from inequality (5) for all base stations in the set $eNB_{nok}$. The respective numbers $N_{dij\_max}$ are sent from base station i to each base station in $eNB_{nok}$. This signalling exchange can be performed directly between base stations, for example, via the X2 interface, or can be centrally controlled, for example, by the Operation and Support System (OSS), which acts as a network management entity.

Step 7: In step 7, it is specified that multiple or all base stations of a network execute the above steps. When one base station is measuring signals from other base stations, the other base stations should be transmitting their respective reference signal. Which base station is currently measuring and which one is currently transmitting its reference signal can be determined by base stations according to a predefined pattern or can also be determined by a central OSS.

Step 8: Having performed the steps 1 to 6 for multiple or all base stations of a network, as described in step 7, each of the base stations may have received multiple proposals of maximum DwPTS sizes $N_{dij\_max}$ from the multiple measuring base stations. Each base station k then selects its number $N_{dk}$ according to the following, wherein $N_{dk}$ denotes the number of OFDM symbols in the downlink frame of the special frame of base station k:

Assume base station k receives multiple values $N_{dik\_max}$ (proposed maximum number of OFDM symbols in downlink frame of special frame of base station k, number proposed by base station i) from base stations i, which belong to a set $eNB_{Inform\_k}$. The set $eNB_{Inform\_k}$ contains the base stations which have sent a proposal of a maximum DwPTS size to base station k Base station k then determines the number of OFDM symbols in the downlink frame of the special subframe, $N_{dk\_max}$, according to $$N_{dk\_max} = \min\left(\min_{i \in eNB_{Inform\_k}} (N_{dik\_max}), N_t - N_{uk} - GP_{min,k}\right), \quad (6)$$

wherein $N_t$ denotes the total number of OFDM symbols per special subframe (this number equals 14 in LTE TDD in case of normal cyclic prefix), $N_{uk}$ denotes the number of OFDM symbols in UpPTS at base station k as calculated in step 6, and $GP_{min,k}$ is the limitation for a guard period of base station k calculated according to equation (1).

$N_{dk}$ is the maximum in all feasible DwPTS size that is smaller than $N_{dk\_max}$.

Figure 8:
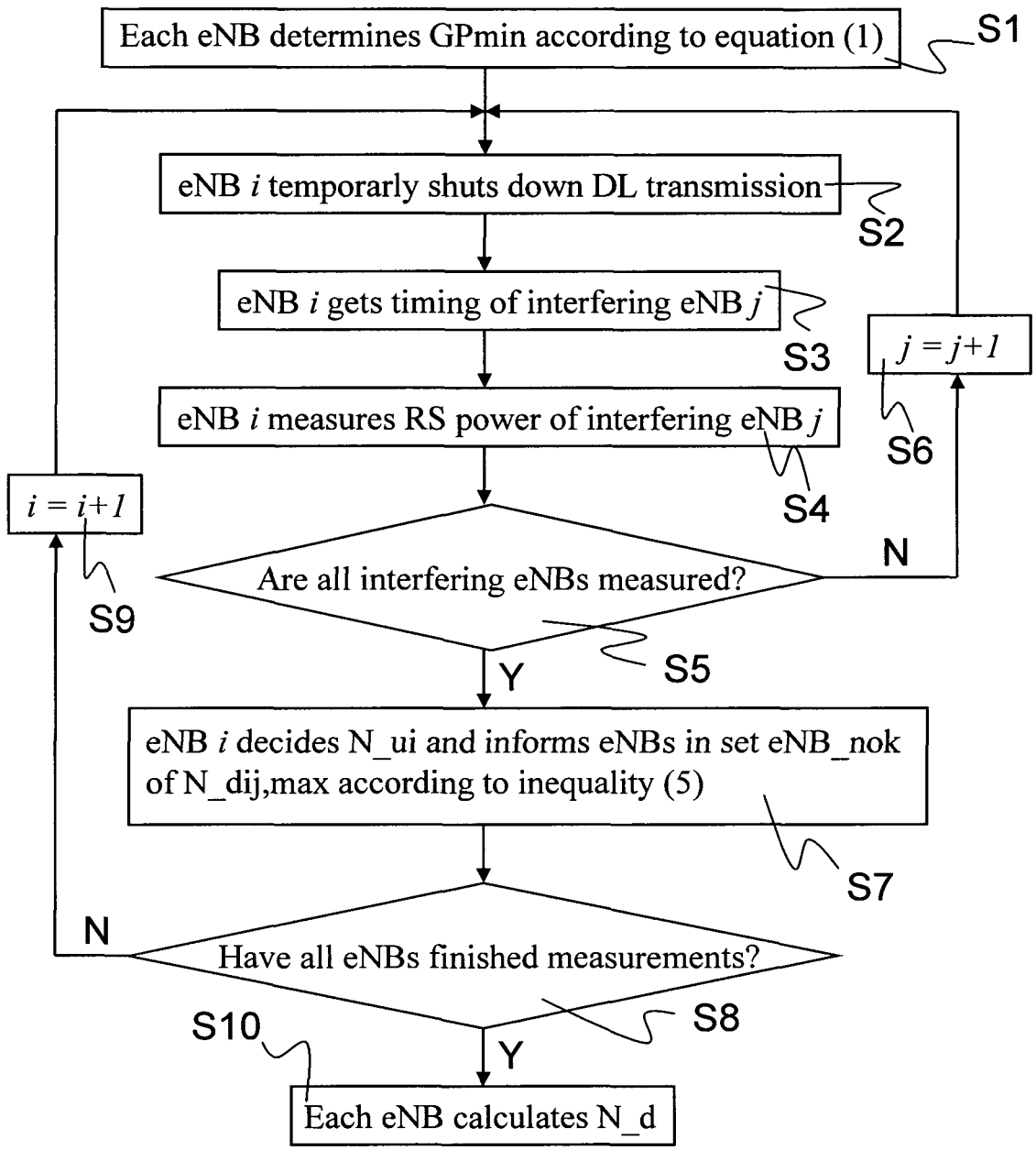
FIG. 8 shows a flow chart of a method according to one embodiment.

The method is also illustrated in the flow chart as depicted in FIG. 8. In step S1, each base station (eNB) calculates the respective guard period $GP_{min}$ according to equation (1). Then, one particularly base station i shuts down its downlink transmissions (step S2), gets timing information of one particular interfering base station j (step S3), and measures the power of the received reference signal (RS) transmitted by the particular interfering base station j (step S4). The steps S2 to S4 are re-done for the other interfering base stations (steps S5 and S6). After the respective reference signals of all interfering base stations have been measured, the base station i determines the number of OFDM symbols $N_{ui}$ in the uplink frame of its special frame and informs the base stations belonging to the set $eNB_{nok}$ (the set of base stations, which cause interference above a threshold at base station i) of the respective maximum number $N_{dij\_max}$ of OFDM symbols in the downlink frame of the special subframe of the respective interfering base station j. The numbers $N_{dij\_max}$ are determined according to equation (5) (step S7). The steps S2 to S7 are re-done for every base station of the network (steps S8 and S9). When all base stations have finished their measurements, each base station can determine its number of OFDM symbols $N_d$ in the downlink frame of its special subframe (step S10).

Figure 9:
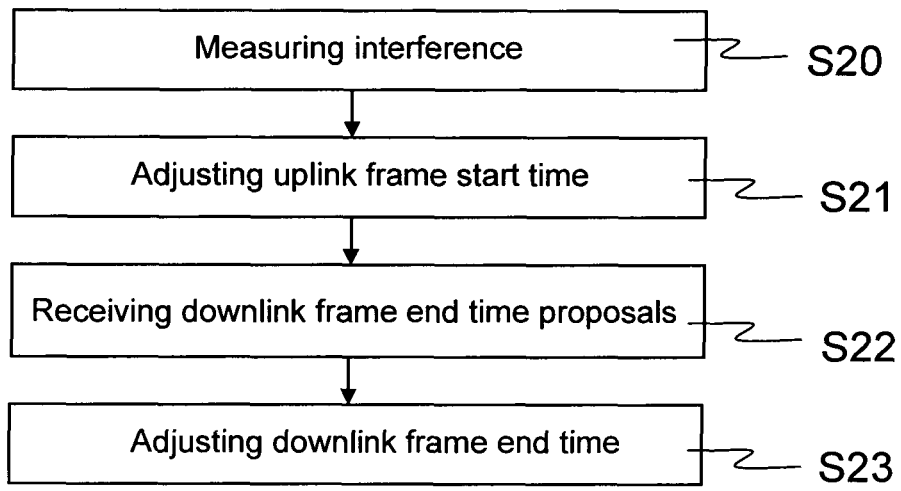
FIG. 9 shows a flow chart of a method according to one embodiment.

FIG. 9 shows a flow chart of a method to adjust at a base station of a cellular wireless communication network a downlink frame end time and an uplink frame start time. The method is carried out at the base station. The base stations of the wireless network use a frame structure comprising a downlink frame, a guard period and an uplink frame. The boundary between the downlink frame and the guard period is defined by the downlink frame end time, the boundary between the guard period and the uplink frame is defined by the uplink frame start time. The method comprises the steps: measuring interference from at least one interfering base station (step S20); adjusting the uplink frame start time in dependence on the measured interference (step S21); receiving at least one downlink frame end time proposal (step S22); and adjusting the downlink frame end time in dependence of the at least one downlink frame end time proposal (step S23).

Here, the position and duration of the guard period is adjusted by adjusting both, the start time of the uplink frame and the end time of the downlink frame. When the method comprises steps S20 and S21 (without steps S22 and S23) the duration of the guard period is adjusted by adjusting the uplink frame start time. When the method comprises the steps S22 and S23 (without steps S20 and S21) the duration of the guard period is adjusted by adjusting the downlink frame end time. Generally, each base station in a network can set its guard period differently and individually. The method may also be adapted to transmit a downlink frame end time proposal for the interfering base stations.

The interference may be measured for each interfering base station individually. Once the guard period within the frame structure is adjusted, subsequent communications shall use the adjusted frame structure. An adjustment of the guard period/frame structure causes at least one subsequent frame to be transmitted in accordance with the adjusted frame structure.

The downlink frame end time proposal is usually received from other measuring base stations, which propose downlink frame end times for the base station, such that the other measuring base stations do not suffer from interference caused by downlink transmissions of the base station. The interference is usually measured individually for each of the interfering base stations. By adjusting the uplink frame start time at the base station the disturbing influence of interference at the base station can be decreased. By adjusting the downlink frame end time at the base station, the interference caused by the base station at other base stations can be decreased.

The method may further comprise the steps: determining a propagation delay between the base station and the interfering base station; determining a downlink frame end time proposal for the interfering base station in dependence on the uplink frame start time and the propagation delay; and informing the interfering base station of the downlink frame end time proposal, if the measured interference from the interfering base station is above a threshold.

The downlink frame end time proposal is chosen such that the interfering base station receiving the proposal will not cause inter base station interference above an acceptable limit for the base station transmitting the proposal. The interfering base station is preferably only informed, if it causes interference above an acceptable level.

The method may further comprise the step of acquiring timing information and an identifier of the interfering base station, wherein the propagation delay is determined in dependence on the timing information and with reference to the identifier. The propagation delay is determined individually for each interfering base station.

The method may further comprise the step of receiving a first reference signal of the interfering base station, wherein the interference measurement is based on the first reference signal. The reference signal can be unique for each base station such that it can be used for identifying the respective interfering base station. The reference signal can further be chosen such that it defines a certain load of the respective interfering base station.

The method may further comprise the step of transmitting a second reference signal used for interference measurement. The second reference signal is intended to be used by other base stations for measuring interference. It may be selected according to a wanted or specified network load or load at the base station. It may also identify the base station.

The method may further comprises the step of determining a guard period in dependence on at least one of a second propagation delay, a cell size, a base station coordinate, and a switching time, wherein the downlink frame end time is also adjusted in dependence on the determined guard period and the determined uplink start time.

The second propagation delay describes the propagation delay between the base station and user equipment served by the base station. The cell size is the size of the cell served by the base station. The switching time comprises the time required for by a UE to switch from a receive mode (downlink) to a transmit mode (uplink).

Furthermore, in the above methods, at least one of the downlink frame end time, the uplink frame start time, the downlink frame end time proposal and the guard period may be defined by a specific integer number of OFDM symbols. Defining the mentioned parameters by an integer number of OFDM symbols results in computational efficient execution of the described methods and reduces required signaling overhead.

Furthermore, in the above methods, the uplink frame start time and the downlink frame end time can be adjusted by using a configuration frame of the frame structure. The configuration frame comprises a number of OFDM symbols, from which a configurable first fraction belongs to the downlink frame and a configurable second fraction belongs to the uplink frame. Such a configuration frame may be a special subframe as discussed.

Optionally, the method is carried out, only if a load of the cellular wireless communication system is below a load threshold. The described training methods shall preferably be executed during low load situations, e.g. during night time.

The method may further comprise the step of receiving an initialization from a predefined pattern or from a network management entity or from the interfering base station to execute the method. The initialization may be used to give a base station of a network the information, when it has to perform the steps such as sending a reference signal, shutting down during a downlink frame, and measuring interference or reference signals. By using the initialization, the methods can be reasonably coordinated for multiple base stations in a network.

The described methods may run in several base stations of a network in a coordinated way. Thereby the basic concept is to predict potential inter base station interference at the (measuring) base station individually for each interfering base station. This is done, for example, by measuring for each base station the specific reference signals (and/or synchronization signals) of the interfering base stations, estimating the channel conditions such as pathloss and propagation delay and by predicting the level of inter base station interference from the interfering base station based on a target network load. The (measuring) base station sets a downlink frame end time and an uplink frame start time to configure a frame structure comprising downlink frame, guard period, uplink frame at the (measuring) base station based on measurement results. It also influences the downlink frame end time of interfering base stations by sending downlink end time proposals to them. On the other side the base station will receive proposals which it can use to determine the own downlink end time.

In this way the downlink frame end time and the uplink frame start time is individually and automatically set at each base station in an optimal way, i.e. by decreasing the impact of inter base station interference while still efficiently using the time resource.

Carrying out the method in several base stations to separately adjust the uplink frame start time and the downlink frame end time at each of the several base stations may be coordinated by a network management unit, such as an OSS.

Figure 10:
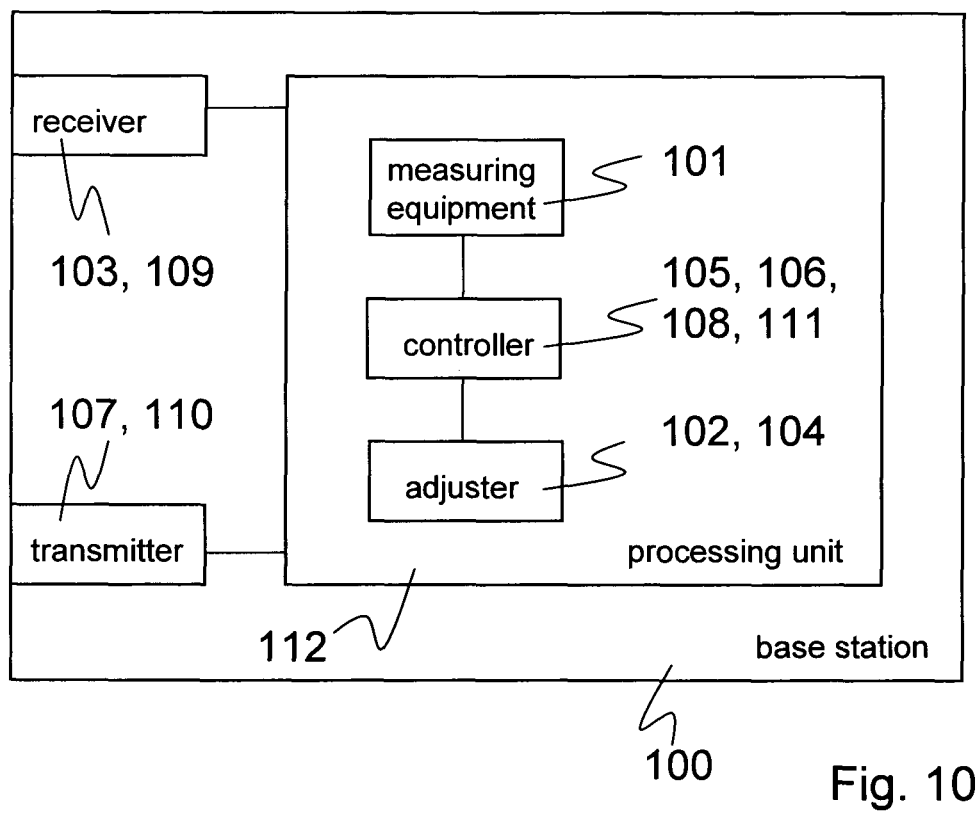
FIG. 10 shows a base station according to one embodiment.

FIG. 10 shows a base station 100 according to one embodiment. The base station 100 comprises: measuring equipment 101 for measuring interference, an adjuster 102 for adjusting an uplink frame start time, a receiver 103 for receiving at least one downlink frame end time proposal, and an adjuster 104 for adjusting a downlink frame end time. The base station may optionally further comprise at least one of: a controller 105 for determining a propagation delay, a controller 106 for determining a downlink frame end time proposal, a transmitter 107 for informing another base station of the downlink frame end time proposal, an controller 108 for acquiring timing information and an identifier, a receiver 109 for receiving a first reference signal, a transmitter 110 for transmitting a second reference signal, a controller 111 for determining a guard period.

The receiver 103 and/or 109 forward the received information to a processing unit 112, in which the elements 101, 102, 104, 105, 106, 108, and 111 may be implemented in hardware or software. After the corresponding processing, respective signals are forwarded to the transmitter 107 and/or 110.

It is to be understood that base stations/eNBs can be all kinds of base stations/eNBs, such as macro-, pico-, femto-, or home base stations/eNBs. Furthermore, as relay nodes also serve their own cells, they are considered to be a base station/eNB within the scope of this invention disclosure.

The invention claimed is:

1. A method for adjusting a guard period in a base station for a cellular wireless communication system, the base station adapted to communicate in a frame structure comprising a downlink frame followed by the guard period followed by an uplink frame, the method comprising:
measuring interference in dependence on time from at least one interfering base station;
adjusting an uplink frame start time within the frame structure based on the measured interference;
determining a guard period based on at least one of:
a second propagation delay;
a cell size;
a base station coordinate; and
a switching time;
adjusting a downlink frame end time based on the determined guard period and the adjusted uplink frame start time.

2. The method of claim 1, further comprising:
receiving at least one downlink frame end time proposal for the base station;
wherein adjusting the downlink frame end time is further based on the at least one downlink frame end time proposal.

3. The method of claim 1, further comprising:
determining a propagation delay between the base station and the interfering base station;
determining a downlink frame end time proposal for the interfering base station based on the uplink frame start time and the propagation delay; and
informing the interfering base station of the downlink frame end time proposal.

4. The method of claim 3, wherein the informing the interfering base station comprises informing the interfering base station if the measured interference from the interfering base station is above a threshold.

5. The method of claim 1:
further comprising receiving a first reference signal of the interfering base station;
wherein the measuring interference comprises measuring interference based on the first reference signal.

6. The method of claim 1, further comprising transmitting a second reference signal for interference measurement.

7. The method of claim 1, wherein the uplink frame start time and the downlink frame end time are adjusted by using a configuration frame within the frame structure.

8. The method of claim 1, wherein the uplink frame start time is defined by an integer number of OFDM symbols.

9. The method of claim 1, wherein the adjusting the uplink frame start time comprises adjusting the uplink frame time if a load of the cellular wireless communication system is below a load threshold.

10. The method of claim 1, further comprising receiving an initialization from a predefined pattern or from a network management entity or from the interfering base station to execute the method.

11. A method for operating a network management entity and for adjusting guard periods individually for a plurality of base stations in a cellular wireless communication system, the base stations adapted to communicate in respective frame structures comprising a downlink frame followed by the guard period followed by an uplink frame, the method comprising:
coordinating execution of an adjusting method for the plurality of base stations, the adjusting method comprising, for a given base station:
measuring interference in dependence on time from at least one interfering base station; and
adjusting an uplink frame start time within the frame structure based on the measured interference;
wherein the method further comprises at least one of:
receiving downlink frame end time proposals for the plurality of base stations;
receiving interference measurement results for the plurality of base stations;
receiving uplink frame start times for the plurality of base stations;
receiving guard period durations for the plurality of base stations; and
adjusting downlink frame end times for the plurality of base stations based on at least one of:
the downlink frame end time proposals;
the interference measurement results;
the uplink frame start times;
the guard period durations.

12. A base station for a cellular wireless communication system, the base station adapted to adjust a guard period at the base station and to communicate in a frame structure comprising a downlink frame followed by the guard period followed by an uplink frame, the base station comprising:
a processing unit, the processing unit comprising at least hardware and configured to:
measure interference in dependence on time from at least one interfering base station;
adjust an uplink frame start time based on the measured interference;
determine a guard period based on at least one of:
a second propagation delay;
a cell size;
a base station coordinate; and
a switching time;
adjust a downlink frame end time based on the determined guard period and the adjusted uplink frame start time.

13. The base station of claim 12:
further comprising a receiver configured to receive at least one downlink frame end time proposal for the base station;

wherein the processing unit is configured to adjust the downlink frame end time further based on the at least one downlink frame end time proposal.

14. The base station of claim 12:
wherein the processing unit is further configured to:
determine a propagation delay between the base station and the interfering base station;
determine a downlink frame end time proposal for the interfering base station based on the uplink frame start time and the propagation delay;
further comprising a transmitter configured to inform the interfering base station of the downlink frame end time proposal.

15. The base station of claim 14, wherein the interfering base station is informed of the downlink frame end time proposal if the measured interference from the interfering base station is above a threshold.

16. The base station of claim 12:
further comprising a receiver configured to receive a first reference signal of the interfering base station;
wherein the processing unit is configured to measure interference based on the first reference signal.

17. The base station of claim 12, further comprising a transmitter configured to transmit a second reference signal for interference measurement.

18. The base station of claim 12, wherein the guard period is defined by an integer number of OFDM symbols.

19. The base station of claim 12, wherein the processing unit is configured to adjust the uplink frame start time and the downlink frame end time by using a configuration frame within the frame structure.

20. A network management entity for a cellular wireless communication system, the network management entity comprising:
a processing unit, the processing unit comprising at least hardware and configured to manage an individual adjustment of guard periods for a plurality of base stations in the cellular wireless communication system, the base stations adapted to communicate in respective frame structures comprising a downlink frame followed by the guard period followed by an uplink frame, the processing unit configured to coordinate execution of an adjusting method for the plurality of base stations, the adjusting method comprising, for a given base station:
measuring interference in dependence on time from at least one interfering base station; and
adjusting an uplink frame start time within the frame structure based on the measured interference;
a receiver configured to receive at least one of:
downlink frame end time proposals for the plurality of base stations;
interference measurement results for the plurality of base stations;
uplink frame start times for the plurality of base stations;
guard period durations for the plurality of base stations; and
wherein the processing unit is further configured to adjust downlink frame end times for the plurality of base stations based on at least one of:
the downlink frame end time proposals;
the interference measurement results;
the uplink frame start times; and
the guard period durations.

21. A computer program product stored in a non-transitory computer readable medium for adjusting a guard period in a base station for a cellular wireless communication system, the base station adapted to communicate in a frame structure comprising a downlink frame followed by the guard period followed by an uplink frame, the computer program product comprising software instructions which, when run on a processor, causes the processor to:
measure interference in dependence on time from at least one interfering base station; and
adjust an uplink frame start time within the frame structure based on the measured interference;
determine a guard period based on at least one of:
a second propagation delay;
a cell size;
a base station coordinate; and
a switching time;
adjust a downlink frame end time based on the determined guard period and the adjusted uplink frame start time.

* * * * *